United States Patent [19]

Stahle et al.

[11] 3,818,094

[45] June 18, 1974

[54] HYPOTENSIVE PHARMACEUTICAL COMPOSITIONS CONTAINING CERTAIN 2-ANILINO-1,3-DIAZACYCLOPENTENES-(2)

[75] Inventors: Helmut Stähle; Herbert Köppe; Karl Zeile, all of Ingelheim/Rhine; Wolfgang Hoefke, Budenheim/Rhein; Hans-Wolfgang Samtleben, Ingelheim/Rhine, all of Germany

[73] Assignee: Boehringer Ingelheim G.m.b.H., Ingelheim am Rhine, Germany

[22] Filed: July 20, 1971

[21] Appl. No.: 164,480

Related U.S. Application Data

[60] Division of Ser. No. 854,034, Aug. 28, 1969, Pat. No. 3,622,579, which is a continuation of Ser. No. 801,863, Feb. 24, 1969, abandoned, which is a continuation-in-part of Ser. No. 583,424, Sept. 30, 1966, abandoned.

[30] Foreign Application Priority Data

Oct. 1, 1965   Germany.............................. 83964

[52] U.S. Cl.................................. 424/273, 424/253
[51] Int. Cl............................................ A61k 27/00
[58] Field of Search............................ 424/273, 253

[56] References Cited
UNITED STATES PATENTS

| | | | |
|---|---|---|---|
| 3,202,660 | 8/1965 | Zeile et al............................ | 260/254 |
| 3,236,857 | 2/1966 | Zeile et al........................ | 260/309.6 |

*Primary Examiner*—Albert T. Meyers
*Assistant Examiner*—Daren M. Stephens
*Attorney, Agent, or Firm*—Hammond & Littell

[57] ABSTRACT

Hypotensive pharmaceutical compositions containing 2-(2'-methyl-3'-bromo-anilino)-1,3-diazacyclopentene-(2),2-(2'-chloro-5'-methoxy-anilino)-1,3-dizacyclopentene-(2), or a non-toxic, pharmacologically acceptable acid addition salt of either of these compounds as an active ingredient; and a method of reducing the blood pressure without appreciably inhibiting the gastric juice secretion rate in warm-blooded animals therewith.

2 Claims, No Drawings

HYPOTENSIVE PHARMACEUTICAL COMPOSITIONS CONTAINING CERTAIN 2-ANILINO-1,3-DIAZACYCLOPENTENES-(2)

This is a division of copending application Ser. No. 854,034, filed Aug. 28, 1969, now U.S. Pat. No. 3,622,579 issued Nov. 23, 1971; which in turn is a continuation of application Ser. No. 801,863, filed Feb. 24, 1969, now abandoned; which in turn is a continuation-in-part of application Ser. No. 583,424, filed Sept. 30, 1966, now abandoned.

This invention relates to novel hypotensive pharmaceutical compositions containing certain 2-anilino-1,3-diazacyclopentenes-(2) or non-toxic acid addition salts thereof as active ingredients, as well as to a method of reducing the blood pressure of warm-blooded animals therewith.

More particularly, the present invention relates to hypotensive pharmaceutical compositions containing as an active ingredient a compound selected from the group consisting of 2-(2'-methyl-3'-bromo-anilino)-1,3-diazacyclopentene-(2), 2-(2'-chloro-5'-methoxy-anilino)-1,3-diazacyclopentene-(2) and non-toxic, pharmacologically acceptable acid addition salts of these compounds.

The active ingredient components of the compositions according to the present invention may be prepared by any of the known methods for the preparation of 2-arylamino-1,3-diazacyclopentenes, such as those described in U.S. Pat. Nos. 2,899,426, 3,202,660 and 3,236,857. However, the following method has proved to be particularly convenient and efficient:

By reacting an isothiouronium salt of the formula

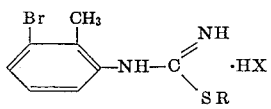

(I)

or

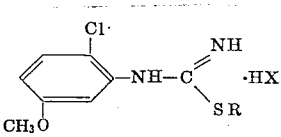

(II)

wherein R is lower alkyl, and X is the anion of an acid, preferably the anion of a hydrohalic acid, with ethylenediamine.

The reaction may be carried out with or without an inert solvent. Thus, the reaction may be effected by simply heating a mixture of the reactants to between 100° and 200°C., whereby satisfactory yields of the desired end product are obtained. Alternatively, the reaction may also be carried out at relatively low temperatures (60°–140°C.) in the presence of a suitable inert solvent, preferably one which contains polar groups, such as water or a lower alkanol; however, under these conditions longer reaction periods must be accepted if good yields are to be achieved.

The isothiouronium salts of the formulas I and II may themselves be prepared by customary methods, such as by heating a corresponding N-phenyl-thiourea derivative, obtained from a correspondingly substituted aniline and ammonium thiocyanate (Houben-Weyl, Vol. 9, p. 887), with an alkylating agent, such as a lower alkyl halide or a di-lower alkylsulfate.

2-(2'-methyl-3'-bromo-anilino)-1,3-diazacyclopentene-(2) and 2-(2'-chloro-5'-methoxy-anilino)-1,3-diazacyclopentene-(2) obtained by this method are organic bases and therefore form non-toxic salts, especially non-toxic, pharmacologically acceptable acid addition salts, with various inorganic or organic acids or synthetic acid resins. Examples of non-toxic, pharmacologically acceptable acid addition salts include, but are not limited to, those formed with hydrochloric acid, hydrobromic acid, phosphoric acid, sulfuric acid, nitric acid, oxalic acid, 8-chlorotheophylline or the like. An example of a non-toxic salt with an acid synthetic resin is that formed with a cross-linked polystyrene polymer containing sulfonic acid groups, such as "Zeo-Karb 225" (manufactured by the Permutit Co., New York).

The following examples illustrate the preparation of the active ingredient components of the compositions according to the present invention.

EXAMPLE 1

Preparation of 2-(2'-methyl-3'-bromo-anilino)-1,3-diazacyclopentene-(2) and its hydrochloride 58.0 gm of 2-amino-6-nitro-toluene were subjected to the Sandmeyer Reaction with Cu-(I)-Br, yielding 20 gm (24.4 percent of theory) of 2-bromo-6-nitro-toluene. The reaction product was subjected to catalytic hydrogenation in the presence of Raney nickel at normal pressure until the theoretical amount of hydrogen had been absorbed, yielding 9.2 gm of 3-bromo-2-methyl-aniline (hydrochloride, m.p. 245°C.).

11.0 gm (0.05 mol) of 3-bromo-2-methyl-aniline hydrochloride were admixed with 4 gm of ammonium thiocyanate (105 percent of the stoichiometrically required amount) and 100 cc of chlorobenzene, and the mixture was heated at 95°–100°C., for about seven hours. Thereafter, the reaction mixture was allowed to cool, and the precipitate formed thereby was separated by vacuum filtration and washed with water and petroleum ether. The raw reaction product thus obtained was digested with 100 cc of water, 100 cc of petroleum ether were added, the solution was made alkaline with sodium carbonate, and the precipitate formed thereby was collected by vacuum filtration.

3.2 gm (0.013 mol; 26.3 percent of theory) of the N-(3-bromo-2-methyl-phenyl)-isothiourea, m.p. 171°C., thus obtained were admixed with 20 cc of methanol and 1.2 cc of methyliodide, and the mixture was boiled for 1.5 hours. Thereafter, the reaction solution was evaporated in vacuo and dried. The residue, N-(3-bromo-2-methyl-phenyl)-isothiouronium hydroiodide (quantitative yield), was admixed with 15 cc of methanol and 1.3 cc of ethylenediamine, and the mixture was refluxed for 16 hours. Thereafter, the methanol was distilled off in vacuo, the residue was dissolved in a small amount of methanol, the solution was made alkaline with aqueous 50 percent potassium hydroxide, allowed to cool and then vigorously stirred with petroleum ether. The precipitate formed thereby was collected by vacuum filtration, washed and dried, yielding 1.7 gm (51.5 percent of theory, based on the amount of isothiouronium salt) of 2-(2'-methyl-3'-bromo-anilino)-1,3-diazacyclopentene-(2), m.p. 105°–107°C., of the formula

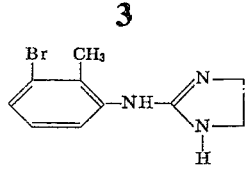

The free base was dissolved in ether, the solution was acidified with ethereal hydrochloric acid, and the precipitate formed thereby was collected and recrystallized from methanol/ether, yielding the hydrochloride of 2-(2'-methyl-3'-bromo-anilino)-1,3-diazacyclopentene-(2), m.p. 210°–211°C., which was thin-layer chromatographically pure.

Analysis:
Calculated: C - 41.34 percent; H - 4.51 percent; N - 14.46 percent
Found: C - 41.34 percent; H - 4.79 percent; N - 14.33 percent

EXAMPLE 2

Preparation of 2-(2'-chloro-5'-methoxy-anilino)-1,3-diazacyclopentene-(2) and its nitrate 37.5 gm (0.2 mol) of 4-chloro-3-nitro-anisole were dissolved in a mixture of methanol and tetrahydrofuran, and the solution was hydrogenated under normal conditions of temperature and pressure in the presence of Raney nickel as a catalyst. After the calculated amount of hydrogen had been absorbed (13.4 liters in 3.5 hours) the hydrogenation was discontinued, the catalyst was separated by vacuum filtration, and the colorless filtrate was evaporated to dryness in vacuo. The residue was taken up in ether, the ethereal solution was purified by filtering it through activated charcoal, and then dry gaseous hydrogen chloride was introduced into the filtrate. The precipitate formed thereby was collected by vacuum filtration and dried, yielding 35.5 gm (0.183 mol; 91.5 percent of theory) of 3-amino-4-chloro-anisole hydrochloride.

The product thus obtained was admixed with 14.6 gm (105 percent of the stoichiometrically required amount) of ammonium thiocyanate and 250 cc of chlorobenzene, and the mixture was heated for six hours at 95°–100°C. Thereafter, the reaction mixture was allowed to cool, the precipitate which had formed was collected by vacuum filtration, and the filter cake was washed with water and petroleum ether. The raw reaction product was digested with about 300 cc of water, 300 cc of petroleum ether were added, the solution was made alkaline with sodium carbonate, and the precipitate was collected by vacuum filtration. 17.0 gm (42.9 percent of theory) of N-(2-chloro-5-methoxy-phenyl)-isothiourea, m.p. 163°–166°C., were obtained.

The isothiourea compound was admixed with 7.3 cc of methyliodide and 75 cc of absolute methanol, and the mixture was boiled for 1.5 hours. Thereafter, the reaction solution was evaporated in vacuo and dried. The residue, N-(2-chloro-5-methoxy-phenyl)-isothiouronium hydroiodide, was admixed with 75 cc of methanol and 7.85 cc of ethylene-diamine (150 percent of the stoichiometrically required amount), and the mixture was refluxed for 17 hours. Subsequently, the methanol and the excess ethylenediamine were distilled off in vacuo, the residue was dissolved in a small amount of methanol, and the resulting solution was made alkaline with aqueous 50 percent potassium hydroxide, cooled and stirred with petroleum ether. The insoluble matter was separated by vacuum filtration, and the filter cake was washed with water, dried and recrystallized from benzene/petroleum ether. 15.0 gm (85 percent of theory) of the free base 2-(2'-chloro-5'-methoxy-anilino)-1,3-diazacyclopentene-(2), m.p. 126°–128°C., of the formula

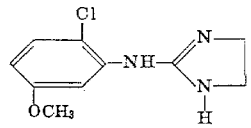

were obtained.

The free base was dissolved in ether, the solution was filtered through activated charcoal, and the filtrate was admixed with concentrated nitric acid until the solution reacted acid to Congo red. The crystalline precipitate formed thereby was collected and recrystallized from methanol/ether, yielding 2-(2'-chloro-5'-methoxy-anilino)-1,3-diazacyclopentene-(2) nitrate, m.p. 177°–178°C., which was thin-layer-chromatographically pure.

2-(2'-Methyl-3'-bromo-anilino)-1,3-diazacyclopentene-(2), 2-(2'-chloro-5'-methoxy-anilino)-1,3-diazacyclopentene-(2) and their non-toxic, pharmacologically acceptable acid addition salts have useful pharmacodynamic properties. More particularly, they exhibit hypotensive activities in warm-blooded animals; their advantage over known compounds of similar structure is that the gastric juice secretion-inhibiting side effect is substantially less pronounced than in said related known compounds, as demonstrated by the following comparative tests.

The tests served for the determination of the influence of the test compounds upon the gastric juice output of the stomach of rats pursuant to the method of Shay et al. Gastroenterology, Vol. 5, page 43 (1945). The tests were made on juvenile rats having a body weight of 100 to 150 gm. For at least two days prior to the start of the tests the rats were fed only white bread, and during the last 24 hours they received only distilled water in order to empty the stomach. Ten rats per dose were used.

The test compounds were injected subcutaneously at dosage levels of 10, 3, 1, 0.3 and 0.1 mgm/kg in physiological saline solution. The animals were anesthetized with ether, and then an incision was made in the abdominal wall below the sternum along the linea alba. A ligature was applied around the pylorus. The abdominal muscles and the skin were then successively carefully clamped or sutured. The animal was weighed, and the corresponding dose of the compound to be tested was injected. In each test series two control animals were administered only physiological saline solution.

After four hours the rats were killed with ether. The abdominal cavity was opened, the cranial esophagus of the cardia was clamped off, the esophagus and the duodenum were severed from the stomach, the stomach contents were emptied into a graduated cylinder, and the volume was recorded. The stomach was then rinsed twice with distilled water, and the rinses were added to the contents of the graduated cylinder. The contents of the cylinder were then filtered into a small Erlenmeyer flask, the graduated cylinder, the funnel and the filter were rinsed with distilled water, and the rinse water was added to the contents of the flask. About two drops of a mixed indicator consisting of Topfer's composition and phenolphthalein (see Shay et al, ibid, page 46) were added to the contents of the flask, and the solution was titrated against 0.1 N sodium hydroxide. The first end point, indicated by a color change from red to salmon, occurred at pH 2.9; the second end point, indicated by a color change from salmon to yellow, occurred at pH 4.0; and the third end point, indicated by a color change from yellow to pink, occurred at pH 8.5. The consumption of sodium hydroxide up to the first end point indicated the amount of free hydrochloric acid in the stomach contents. In order to determine the amount of bonded HCl, the median value of the second and third end point was calculated, from which the amount of free HCl was subtracted. The total consumption of NaOH at the third end point was designated as the total acidity.

The $ED_{50}$-values shown in the following table were graphically determined from the individual test dosages and represent the dose of the test compound which produces a 50 percent reduction in the secreted gastric juice volume or a 50 percent decrease in the total acidity, compared to the controls. The smaller the $ED_{50}$, the greater the gastric juice secretion-inhibiting activity of the particular compound. The last column in the table also shows the average of the two $ED_{50}$ values given.

TABLE I

| Compound | Gastric Juice Volume | ED50 in mgm/kg Total Acidity | Average |
|---|---|---|---|
| Prior art: Dutch Application No. 6,411,516 | | | |
| 2-(2'-Chloro-6'-methyl-anilino)-1,3-diazacyclo-pentene-(2) · HCl | 0.115 | 0.057 | 0.086 |
| 2-(2'-Chloro-4'-methyl-anilino)-1,3-diazacyclo-pentene-(2) · HCl | 0.200 | 0.180 | 0.190 |
| Present invention: | | | |
| 2-(2'-Methyl-3'-bromo-anilino)-1,3-diazacyclo-pentene-(2) · HCl | 0.850 | 0.390 | 0.620 |

The hypotensive activity of the active ingredients of the compositions according to the present invention was ascertained by direct measurement of the blood pressure changes in the carotid artery of rabbits after administration of the compounds; all were found to be effective hypotensives.

The test method was carried out as follows:
Bastard rabbits of both sexes, with a body weight of about 2 to 3 kg were first weighed and then anesthetized with 0.75 gm/kg of urethane i.p.

The fur on the neck of the animals was removed, a longitudinal incision 7 to 10 cm long was made, and the trachea was exposed into which a respiration canula was tied in order to be able to apply artificial respiration to the animal in an emergency. One of the two carotid arteries lying on both sides of the trachea was exposed, and the canula of a manometer was tied into it. The jugular vein was exposed from the fatty tissue, and a canula, provided with a stopcock, was tied into it as a means for intravenous administration of the test compounds.

The body temperature of the animal was continuously measured rectally and, if necessary, was maintained at 37° to 38°C. with a heating pad.

The compound under investigation was injected into the jugular vein at dosages of 0.01, 0.03, 0.1, 1 and 3 mgm/kg body weight in increasing as well as decreasing sequence, and the resulting blood pressure changes were recorded. Between injections, a waiting period equal to double the period of effective action was used before the next injection was administered. One compound was tested on each animal, and from 2 to 9 tests per compound were performed.

In addition to the compounds of the present invention, 2-(2'-methyl-3'-chloro-anilino)-1,3-diazacyclopentene-(2), disclosed by Najer et al. in Bull. Soc. Chim. France 1951, 2114 et seq., was tested for its effect upon the blood pressure. The following table shows the results obtained with this compound as well as those obtained with the analogous 3'-bromo-compound according to the present invention.

TABLE II

| Compound | Number of Tests | Blood Pressure mgm/kg | Dosage Change mm.Hg |
|---|---|---|---|
| Prior art: Najer et al | 5 | 0.01 | 0 |
| 2-(2'-Methyl-3'-chloro-anilino)-1,3-diazacyclo-pentene-(2) | 6 | 0.03 | + 4.5 ± 2.6 |
| | 4 | 0.1 | +14.7 ± 5.6 |
| | 4 | 0.3 | +31.5 ±10.9 |
| | 3 | 1 | +35.6 ±11.9 |
| | 3 | 3 | +32.2 ± 5.5 |
| Present invention: 2-(2'-Methyl-3'-bromo-anilino)-1,3-diazacyclo-pentene-(2) | 4 | 0.001 | − 6.7 ± 2.25 |
| | 4 | 0.003 | − 8.5 ± 2.1 |
| | 6 | 0.01 | −12.6 ±0.79 |
| | 9 | 0.03 | −33 ±4.71 |
| | 5 | 0.1 | −29.2 ±4.55 |
| | 2 | 0.3 | −29.5 ±9.55 |

These results clearly show that the compound according to the present invention has a blood pressure reducing effect, whereas the Najer et al compound has exactly the opposite effect.

For pharmaceutical purposes the compounds according to the present invention are administered to warm-blooded animals perorally or parenterally as active ingredients in customary dosage unit compositions, that is, compositions in dosage unit form consisting essentially of an inert pharmaceutical carrier and one effective dosage unit of the active ingredient, such as tablets, coated pills, capsules, wafers, powders, solutions, suspensions, emulsions, syrups, suppositories and the like. One effective hypotensive dosage unit of the compounds according to the present invention is from 0.00-083 to 0.84 mgm/kg body weight. A dosage unit composition comprising a compound according to the invention as an active ingredient may, if desired, also contain an effective unit dose of another pharmacodynamically active ingredient, such as a saluretic agent, i.e. a compound which promotes the discharge of salt through the urine.

The following examples illustrate a few dosage unit compositions according to the instant invention and represent the best mode contemplated of putting the invention to practical use. The parts are parts by weight unless otherwise specified.

EXAMPLE 3

Tablets

The tablet composition was compounded from the following ingredients:

| | 2-(2'-Methyl-3'-bromo-anilino)-1,3-diazacyclopentene-(2) hydrochloride | parts 0.15 |
|---|---|---|
| | Lactose | 53.00 |
| | Corn starch | 31.60 |
| | Soluble starch | 4.00 |
| 1.00 | Magnesium stearate | |
| | Total | 89.75 |

The individual ingredients were admixed with each other in a manner customary for manufacture of pharmaceutical tablets, and the mixture was pressed into 89.75 mgm-tablets. Each tablet contained 0.15 mgm of the diazacyclopentene compound and, when administered perorally to a warm-blooded animal of about 60 kg body weight in need of such treatment, produced very good hypotensive effects without appreciably reducing the gastric juice secretion rate in the stomach.

EXAMPLE 4

Drop Solution

The solution was compounded from the following ingredients:

| 2-(2'-Chloro-5'-methoxy-anilino)-1,3-diazacyclopentene-(2) hydrochloride | parts 0.10 |
|---|---|
| p-Hydroxy-benzoic acid methyl ester | 0.07 |
| p-Hydroxy-benzoic acid propyl ester | 0.03 |
| Demineralized water q.s.ad | 100.00 by vol. |

The individual ingredients were dissolved in a sufficient amount of demineralized water, the solution was diluted with additional demineralized water to the desired volume, and the finished solution was filtered. 1 cc of solution (about 20 drops) contained 1.0 mgm of the diazacyclopentene compound and, when administered perorally to a warm-blooded animal of about 60 kg body weight in need of such treatment, produced very good hypotensive effects without appreciably reducing the gastric juice secretion rate in the stomach.

EXAMPLE 5

Hypodermic Solution

The solution was compounded from the following ingredients:

| 2-(2'-Methyl-3'-bromo-anilino)-1,3-diazacyclopentene-(2) hydrochloride | parts 0.05 |
|---|---|
| Sodium chloride | 18.00 |
| Distilled water q.s.ad | 2000.00 by vol. |

The individual ingredients were dissolved in a sufficient amount of distilled water, the solution was diluted with additional distilled water to the desired volume, the dilute solution was filtered until free from suspended particles and then filled into 2 cc-ampules, which were subsequently sterilized and sealed. Each ampule contained 0.05 mgm of the diazacyclopentene compound, and when the contents thereof were administered by intravenous injection to a warm-blooded animal of about 60 kg body weight in need of such treatment, very good hypotensive effects were obtained without appreciably reducing the gastric juice secretion rate in the stomach.

EXAMPLE 6

Suppositories

The suppository composition was compounded from the following ingredients:

| 2-(2'-Methyl-3'-bromo-anilino)-1,3-diazacyclopentene-(2) | Parts 0.3 |
|---|---|
| Lactose | 244.2 |
| Cocoa butter q.s.ad | 1700.0 |

The cocoa butter was melted, the remaining ingredients were stirred into it, the mixture was homogenized, and the finished composition was poured into cooled suppository molds, each holding 1700 mgm of the composition. Each suppository contained 0.3 mgm of the diazacyclopentene compound and, when administered by the rectal route to a warm-blooded animal of about 60 kg body weight in need of such treatment, produced very good hypotensive effects without appreciably reducing the gastric juice secretion rate in the stomach.

Analogous results were obtained when an equal amount of 2-(2'-methyl-3'-bromo-anilino)-1,3-diazacyclopentene-(2), 2-(2'-chloro-5'-methoxy-anilino)-1,3-diazacyclopentene-(2) or a non-toxic acid addition salt of either of these was substituted for the particular diazacyclopentene compounds in Examples 3 to 6. Likewise, the amount of active ingredient in these examples may be varied to achieve the dosage unit range set forth above, and the amounts and nature of the inert pharmaceutical carrier ingredients may be varied to meet particular requirements.

While the present invention has been illustrated with the aid of certain specific embodiments thereof, it will be readily apparent to others skilled in the art that the invention is not limited to these particular embodiments, and that various changes and modifications may be made without departing from the spirit of the invention or the scope of the appended claims.

We claim:

1. A hypotensive pharmaceutical dosage unit composition consisting essentially of an inert pharmaceutical carrier and a hypotensively effective amount of a compound selected from the group consisting of 2-(2'-methyl-3'-bromo-anilino)-1,3-diazacyclopentene-(2), 2-(2'-chloro-5'-methoxy-anilino)-1,3-diazacyclopentene-(2) and a non-toxic, pharmacologically acceptable acid addition salt thereof.

2. The method of reducing the blood pressure without appreciably inhibiting the gastic juice secretion rate in a warm-blooded animal in need of such treatment, which comprises administering to said animal from 0.0-0083 to 0.84 mgm/kg body weight of a compound selected from the group consisting of 2-(2'-methyl-3'-bromo-anilino)-1,3-diazacyclopentene-(2), 2-(2'-chloro-5'-methoxy-anilino)-1,3-diazacyclopentene-(2) and a non-toxic, pharmacologically acceptable acid addition salt thereof.

* * * * *